United States Patent
Abney, II

(10) Patent No.: US 7,428,798 B2
(45) Date of Patent: Sep. 30, 2008

(54) VERTICALLY SEPARATING PLANT POT

(76) Inventor: William T. Abney, II, 1619 Ramsgate Ct., Riverside, CA (US) 92506

( * ) Notice: Subject to any disclaimer, the term of this patent is extended or adjusted under 35 U.S.C. 154(b) by 51 days.

(21) Appl. No.: 11/336,393

(22) Filed: Jan. 19, 2006

(65) Prior Publication Data

US 2006/0156625 A1    Jul. 20, 2006

Related U.S. Application Data

(60) Provisional application No. 60/645,351, filed on Jan. 19, 2005.

(51) Int. Cl.
*A01G 23/02* (2006.01)
*A01G 9/02* (2006.01)

(52) U.S. Cl. ............................ 47/73; 47/66.1

(58) Field of Classification Search ...................... 47/73, 47/66.1, 66.3, 65.5, 66.4, 66.2
See application file for complete search history.

(56) References Cited

U.S. PATENT DOCUMENTS

| | | | |
|---|---|---|---|
| 78,233 A | 5/1868 | Poullain | |
| 129,972 A | 7/1872 | Ludlum | |
| 402,722 A | 5/1889 | Cook | |
| 436,183 A | 9/1890 | Moore et al. | |
| 473,836 A | 4/1892 | Goodacre | |
| 548,763 A | 10/1895 | Simpson | |
| 592,066 A | 10/1897 | Simpson | |
| 599,263 A | 2/1898 | Sherman | |
| 1,774,019 A * | 8/1930 | Lam | 47/73 |
| 2,022,607 A | 11/1935 | Sorensen | |
| 2,220,497 A * | 11/1940 | Robinson | 47/64 |
| 2,594,307 A * | 4/1952 | Valenzuela | 47/73 |
| 3,065,570 A * | 11/1962 | Fukuhara | 47/73 |
| 3,076,289 A | 2/1963 | Gallo | |
| 3,162,981 A | 12/1964 | Miller | |
| 3,195,272 A | 7/1965 | Mosher et al. | |
| 3,313,333 A | 4/1967 | Lordi | |
| D226,279 S | 2/1973 | Eyerly | |
| 4,325,202 A | 4/1982 | Liard | |
| 4,628,634 A | 12/1986 | Anderson | |
| 4,850,136 A | 7/1989 | Vollers | |

(Continued)

OTHER PUBLICATIONS

Advertisment for Polly Pot™ in *Lawn & Garden Retailer* Magazine, vol. 4, No. 1, p. 24; Nov. 2005.

*Primary Examiner*—Michael R. Mansen
*Assistant Examiner*—Monica L Williams
(74) *Attorney, Agent, or Firm*—Knobbe, Martens, Olson & Bear, LLP

(57) ABSTRACT

A plant pot having a wider base than throat and which can be vertically separated into two substantially identical pieces is provided. The plant pot preferably comprises a first pot member and a second pot member that are capable of engaging and disengaging each other. Complementary edges on the first pot member and the second pot member allow such members to define a substantially continuous inner wall when the first pot member and the second pot member are engaged. At least one retainer extends about an outer surface of the plant pot to retain the first pot member and the second pot member in an engaged position. In one embodiment, the first pot member and the second pot member are identical such that they are manufactured from the same mold thereby reducing manufacturing costs and simplifying production of such plant pot.

16 Claims, 7 Drawing Sheets

U.S. PATENT DOCUMENTS

| | | |
|---|---|---|
| 4,939,865 A | 7/1990 | Whitcomb et al. |
| 4,995,191 A | 2/1991 | Davis |
| 5,157,869 A * | 10/1992 | Minton .................... 47/73 |
| D361,292 S | 8/1995 | Weder et al. |
| D416,214 S | 11/1999 | Conner |
| 6,018,908 A | 2/2000 | Charrin et al. |
| 6,427,379 B1 | 8/2002 | Lehner |
| 6,481,593 B2 | 11/2002 | Banhagel |
| 6,553,714 B2 | 4/2003 | Vahrmeyer |
| 6,694,671 B2 | 2/2004 | Vehrmeyer |
| 6,904,715 B1 | 6/2005 | Lawton |
| 2002/0100210 A1 | 8/2002 | Vahrmeyer |
| 2003/0034266 A1 | 2/2003 | Banhagel |

* cited by examiner

VERTICALLY SEPARATING PLANT POT

CROSS-REFERENCE TO RELATED APPLICATIONS

This application claims priority under 35 U.S.C. § 119(e) to U.S. Provisional Application Ser. No. 60/645,351 filed on Jan. 19, 2005, the entire content of which is hereby incorporated by reference.

BACKGROUND OF THE INVENTION

1. Field of the Invention

The present invention generally relates to pots for use with plants. In particular, the present invention concerns a plant pot that has a wider base than throat so as to provide greater stability and is separable to facilitate removal of plants from the pot.

2. Description of the Related Art

Plant pots are typically smaller in diameter at the base than they are at the opening or throat. Plant pots are usually designed in this fashion so that a plant can be more readily removed from the pot when it grows for subsequent replanting into other pots or into the ground. One difficulty of pots having this configuration is that the pots are less stable as more of the weight is positioned above the actual base of the pot thereby making the pot more inclined to be tipped over.

To address this particular concern, pots have been developed that have a wider base than throat to improve the stability of the pot. Pots have even been developed that are formed of two separable halves to thereby permit disassembly of the pot and removal of the plant contained therein. Mechanisms for attaching separable halves of pots have included hinges, pins, and similar items.

Separable pots can be relatively expensive to manufacture because often each pot member has one or more features that is different from the other pot member. As a result, typical separable pots can require up to double the manufacturing costs associated with non-separable plant pots since two distinct pieces are manufactured. If molding processes are used to manufacture the separable plant pot, two molds might be required which can increase manufacturing and production costs significantly.

While these pots provide somewhat greater stability and also allow for removal of the plant contained therein, these pots are generally difficult to assemble and use. Hence, there is a need for an improved pot that provides greater stability and still allows for easy removal and replanting of the plant. To this end, there is a need for a pot that has a broader base than throat and is also separable wherein the pot is designed to be assembled and disassembled in an easy manner and is also inexpensive to manufacture.

SUMMARY OF THE INVENTION

Preferred embodiments of the present plant pot provide a separating pot that is easy to assemble and disassemble. The preferred embodiments permit two pot members to engage and attach so as to provide a cavity to place a plant and detach so as to remove a plant contained therein for replanting or other purposes. The wider base than throat of the present pot provides for enhanced stability and functionality of the plant pot. In addition, the pot members can be identical so as to minimize manufacturing costs of the pot.

In one embodiment, a plant pot includes a first pot member having a base section with edges having a first configuration and a second configuration and a body section with edges having a third configuration and a fourth configuration. The body section of the first pot member extends from the base section and terminates at a throat that defines an area which is smaller than an area defined by the base section of the first pot member. The plant pot also includes a second pot member having a base section with edges having a first configuration and a second configuration and a body section with edges having a third configuration and a fourth configuration. The body section of the second pot member extends from the base section and terminates at a throat that defines an area which is smaller than an area defined by the base section of the second pot member.

The edges of the base section and body section of the first pot member are complementary to the edges of the base section and body section of the second pot member, respectively, such that the first pot member and second pot member can engage and mate with each other so as to define a substantially continuous wall. An inner space of the pot defined by the first pot member and the second pot member is capable of receiving and housing a plant therein. In addition, the present plant pot includes at least one retainer that extends about an outer surface of the pot so as to retain the first pot member and the second pot member in an engaged configuration. The at least one retainer can be disengaged so as to permit the first pot member and the second pot member to be separated from each other so to remove the plant contained therein.

In another embodiment, the first pot member and the second pot member are identical and symmetrical. Advantageously, in such embodiment, the pot members can be manufactured from the same mold thereby minimizing the cost of manufacturing the pot.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following ten figures.

DETAILED DESCRIPTION OF THE PREFERRED EMBODIMENT

Embodiments of the invention will now be described with reference to the accompanying drawings, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 3:
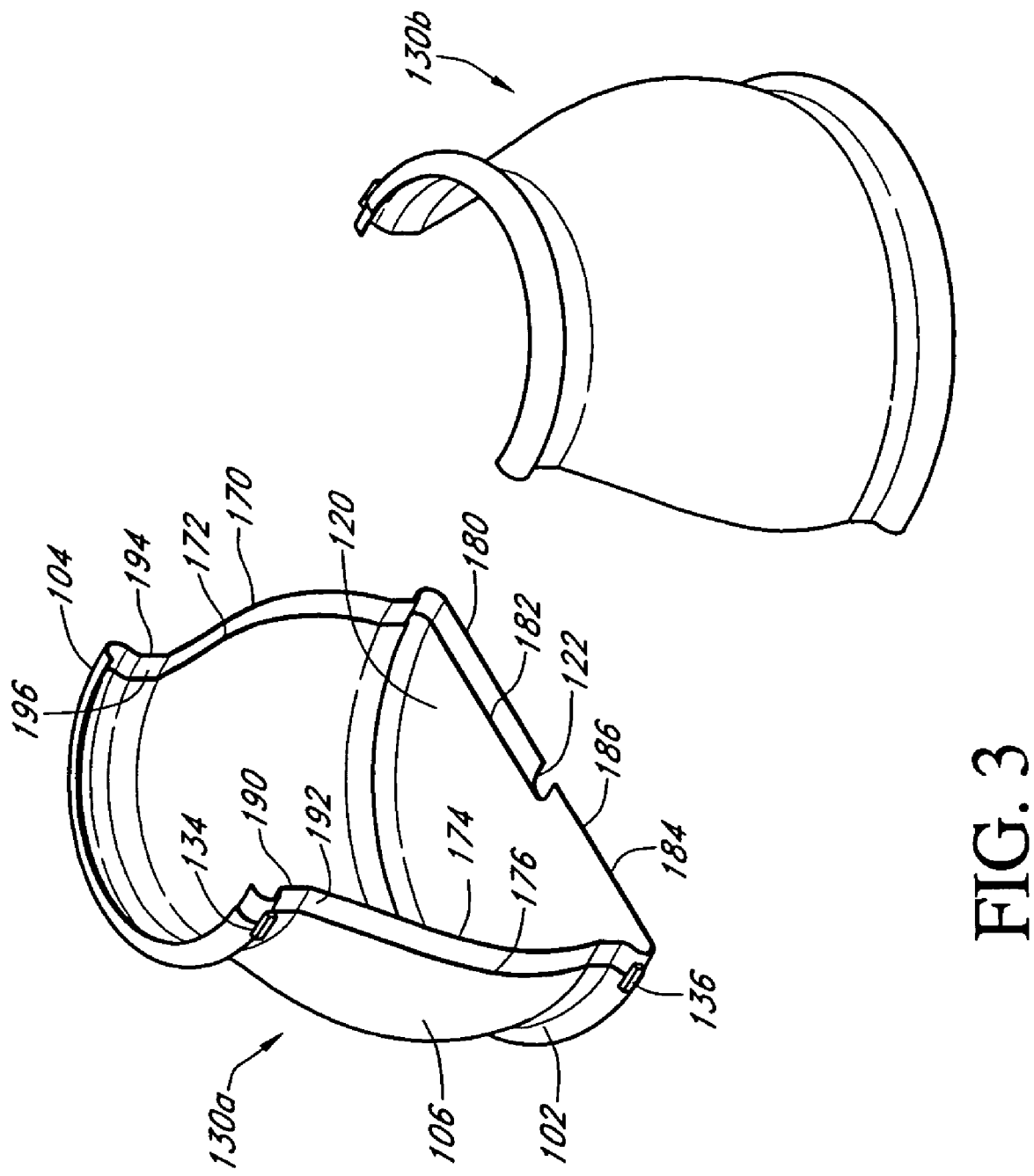
FIG. 3 is a perspective view showing a first pot member and a second pot member of the plant pot detached from one another.
Figure 4:
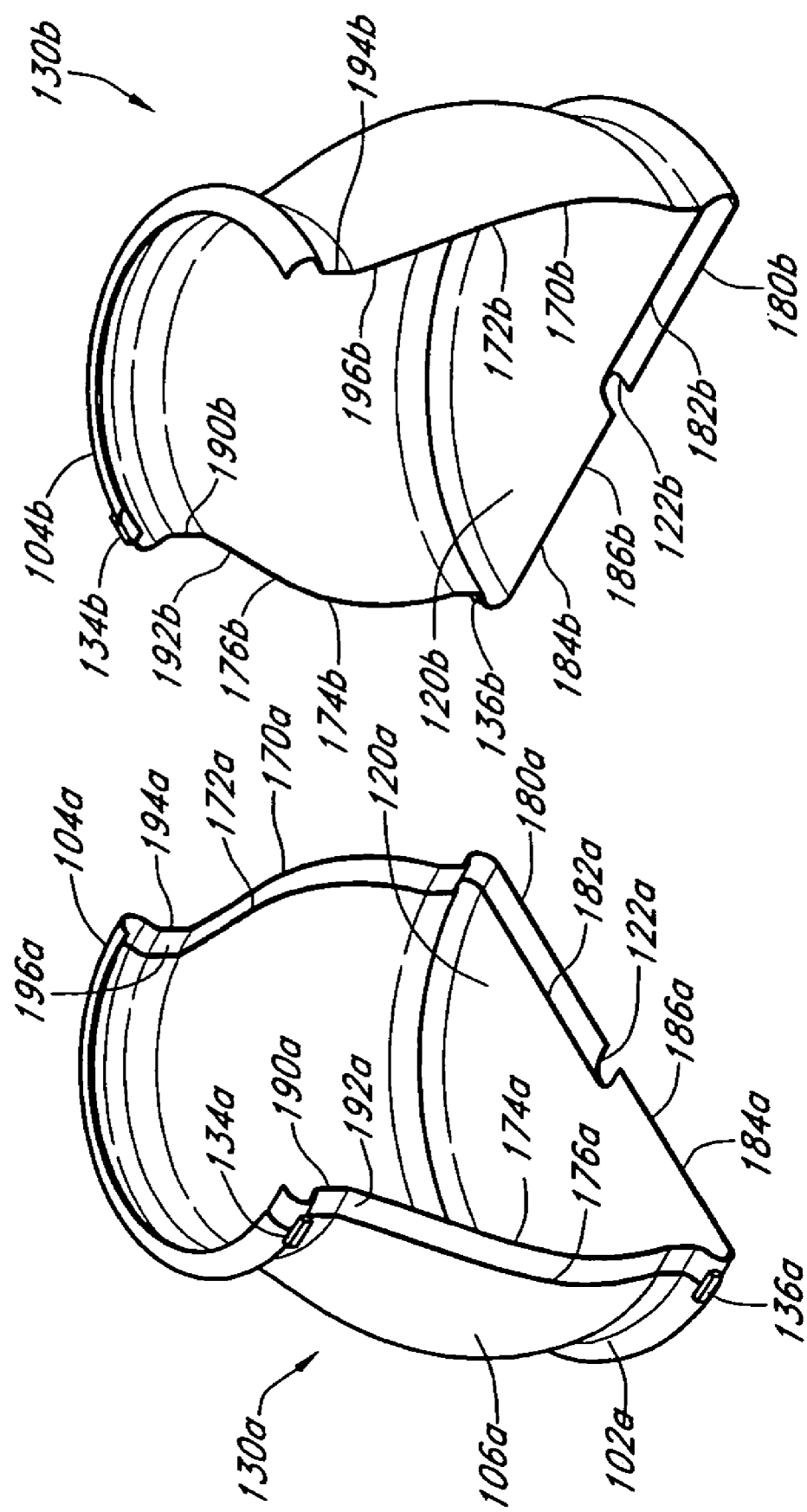
FIG. 4 is a perspective view showing the interior surfaces and edges of a first pot member and a second pot member of the plant pot when detached from one another.
Figure 5:
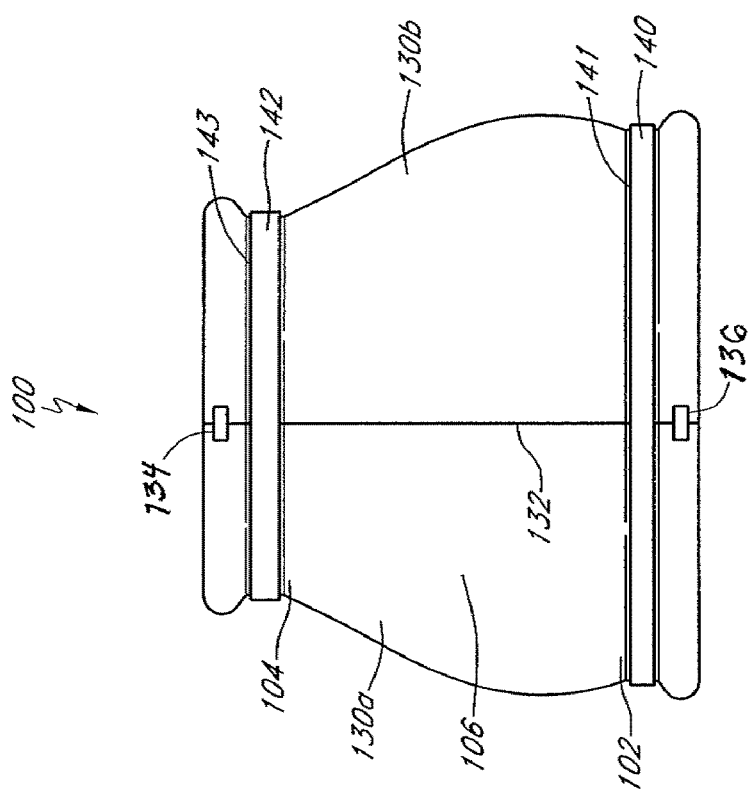
FIG. 5 is a front elevation view of the plant pot where a first pot member and a second pot member are engaged and attached as shown in FIG. 1.

The aforementioned needs are satisfied by the plant pot of the illustrated embodiment which is illustrated in FIGS. 1-10 enclosed herewith. Specifically, with regards to FIG. 1, a pot 100 is shown wherein the base section 102 of the pot 100 is wider than the throat 104 of the pot 100. As will be described in greater detail, the pot 100 comprises two pot members 130a, 130b that are held together by retainers 140, 142 (as shown in FIG. 5) with the retainers 140, 142 preferably being located initially adjacent the base section 102 and also located adjacent the throat 104 of the pot 100.

The pot 100 has a body section 106 that is coupled to the base section 102 of the pot 100 and extends outward therefrom in a generally vertical direction relative to the base section 102. The body section 106 terminates at the throat 104 of the pot 100. The throat 104 defines an opening 110 in the plant pot 100 such that the opening 110 can be used to access a plant that is positioned within the pot 100. The opening 110 can also be used to add water or nutrients to the plant or add soil or other potting material to the plant positioned within the pot 100. The combination of the base section 102, body section 106, and throat 104 of the pot 100 define a cavity 108 that is substantially enclosed and that is capable of receiving a plant and maintaining the plant within the pot 100 during the life of the plant.

Figure 1:
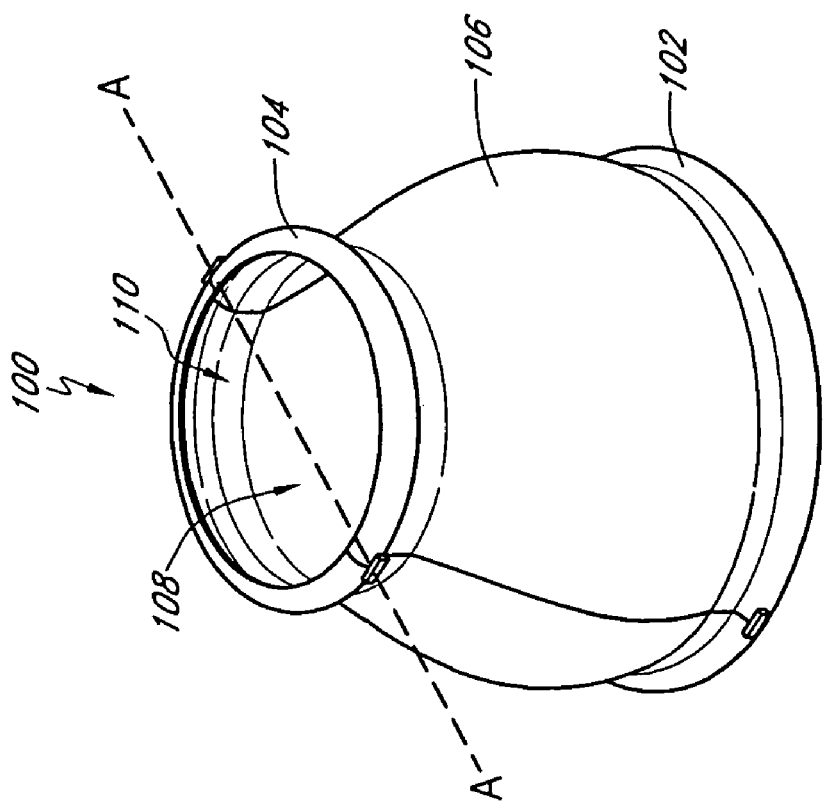
FIG. 1 is a perspective view showing an opening and partial cavity of the plant pot of the present invention.

In one embodiment, the pot 100 is comprised of a first pot member 130a and a second pot member 130b (as shown in FIGS. 3 and 4) that can engage so as to form a substantially continuous inner and outer surface of the plant pot 100. The first pot member 130a and the second pot member 130b engage along a plane containing the line A-A as shown in FIG. 1. Line A-A preferably divides the pot 100 into two identical and symmetrical members such that the members can engage so as to hold a plant within the pot 100 and disengage so as to remove a plant from inside the plant pot 100. However, the two members need not be identical and symmetrical. In other embodiments of the present invention, one member may be larger or smaller than the other member depending on the particular preferences of the user of the pot 100. In addition, the members may be non-symmetrical such that one member has features and structure that the other member does not have.

As shown in FIG. 1, the base section 102 of the pot 100 is larger than the throat 104 of the pot 100. Having a larger base 102 than throat 104 increases the stability of the pot 100 because the center of gravity of the pot 100 is located closer to the base 102 of the pot 100 thereby reducing the likelihood of tipping over or inadvertently moving the pot 100. Advantageously, such a configuration decreases the likelihood that wind will tip over the pot 100 which is a common problem associated with plant pots having a larger throat than base.

Figure 2:
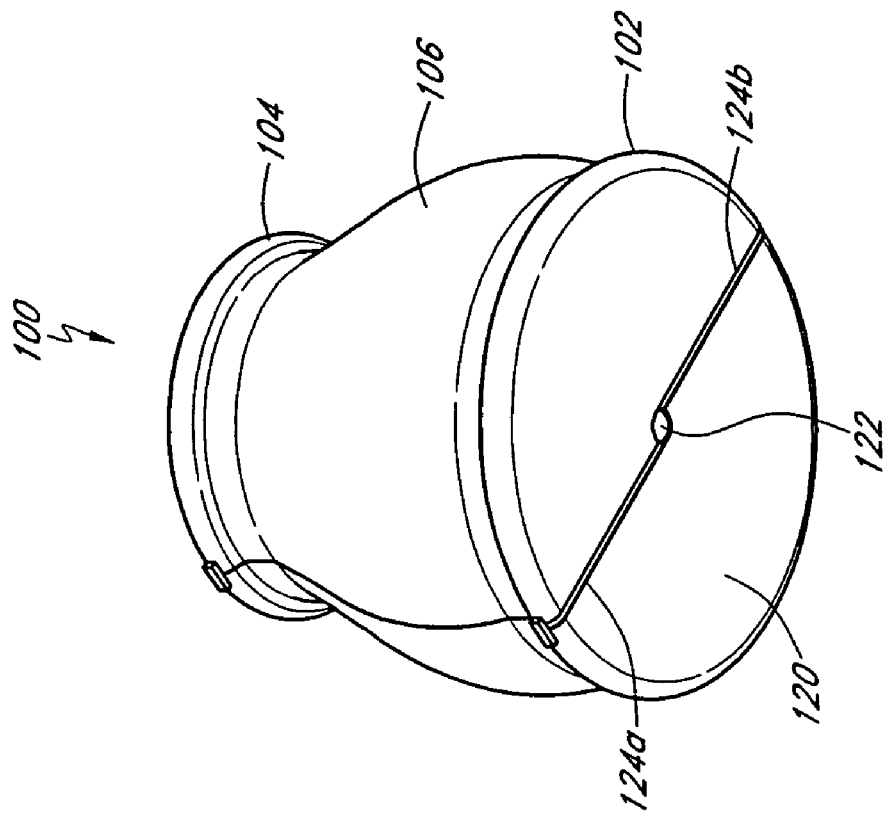
FIG. 2 is a perspective view showing a bottom surface of the plant pot as shown in FIG. 1.

As shown in FIG. 2, the plant pot 100 has a bottom surface 120 disposed on the base section 102 of the pot 100. In one embodiment, the bottom surface 120 is substantially flat such that the pot 100 can be positioned on the ground and maintain firm and sturdy contact with the ground so as to not be tipped over in normal conditions. In another embodiment, the bottom surface 120 has a drainage hole 122 that is defined by round indentations on the first pot member 130a and the second pot member 130b (as shown in FIGS. 3 and 4). The drainage hole 122 permits excess drain water to pass through the bottom surface 120 of the plant pot 100 so as to maintain proper moisture conditions within the pot 100 to facilitate proper plant health and growth.

In one embodiment of the plant pot 100, the pot 100 has drainage channels 124a, 124b that further facilitate the removal of excess drainage water from the plant pot 100. In one embodiment, the drainage channels 124a, 124b are approximately ⅜ inches wide and receive excess drain water from the drainage hole 122 and direct such excess water away from the plant pot 100 to the surrounding environment. The drainage channels 124a, 124b can comprise two drainage channels each extending from the drainage hole 122 and to opposite sides of the plant pot 100, as illustrated in FIG. 2.

The drainage channels 124a, 124b are defined by narrow gaps at the edges of the bottom surfaces of the first pot member 130a and the second pot member 130b (as shown in FIGS. 3 and 4). Excess drain water that exits the drainage hole 122 tends to concentrate at the drainage 122 hole and as more excess drain water exits the drainage hole 122 the drain water becomes pressurized and is forced through the drain channels 124a, 124b. The drain channels 124a, 124b direct such pressurized drain water from the drainage hole 122 to the outer rim of the bottom surface 120 of the plant pot 100 and to the ground or other surface upon which the plant pot 100 is positioned. Advantageously, such drainage channels 124a, 124b reduce the build-up of drain water at the drainage hole 122 and provide a built-in drainage system for the plant pot 100 such that the user need not be concerned about manually removing excess drain water from the plant pot 100.

The pot 100 can be composed of a variety of materials. In one embodiment, the members of the pot are comprised of an acrylonitrile-butadiene-styrene (ABS) copolymer thermoplastic material. Such ABS material is advantageous because it provides a high-strength, durable surface while at the same time minimizing the weight of the pot 100. For example, in one embodiment, each pot member weighs approximately 3.6 lbs so that the plant pot weighs just over 7 lbs in total. Such reduced weight is desirable because plant pots can become quite heavy when filled with soil and the plants themselves. Keeping the weight of the pot to a minimum is particularly important in accommodating older users of plant pots who may have difficulty carrying and moving heavy plant pots, such as those composed of stone or concrete. In other embodiments, the plant pot 100 may also be composed of, for example, a foam material. Advantageously, the material used in the present plant pot and the overall weight of the pot can be configured to accommodate a variety of potential users of plant pots.

The two pot members 130a, 130b comprising the pot 100 are better shown in FIGS. 3 and 4. As will be described in greater detail below, the pot members 130a, 130b are preferably identical to one another such that they can be positioned adjacent to each other with edges overlapping each other to thereby define a continuous interior surface of the pot at both the base of the pot 102 and also along the body section 106. By designing the pot members 130a, 130b to have complementary flanges and recesses which match one another, the pots can be manufactured out of a single mold with the flanges positioned into the recesses such that a continuous sidewall and bottom surface is achieved. Advantageously, this will reduce the leakage of water or dirt from the pot 100 when the pot 100 is assembled and held together by the restraining bands.

In particular, with respect to the first pot member 130a, the right-hand side of the body section 106a of the plant pot 100 has a sidewall flange 170a that defines a sidewall recess 172a on the interior. Similarly, the left-hand side includes an exterior recess 176a with an interior flange 174a. The second pot member 130b has the same configuration such that the interior flange 174a of the first pot member 130b can be positioned into the sidewall recess 172b of the second pot member 130b and with the sidewall flange 170a of the first pot member 130a being positioned in the exterior recess 176b of the second pot member 130b. In this way, a substantially continuous interior surface is defined on the interior of the plant pot 100.

Moreover, with respect to the base section 102 of the plant pot 100, the first pot member 130a defines an exterior flange 180a with an interior recess 182a on the right-hand side of the base section 102a extending from a round drain indentation 122a to the sidewall of the pot 100. Similarly, the left-hand side of the base section 102a of the first pot member 130a has an interior flange 186a which defines an exterior recess 184a. The second pot member 130b has an identical and complementary structure such that when the second pot member 130b is positioned together with the first pot member 130a, the base section 102a of the first pot member 130a of the base section 102b of the second pot member 130b form a continuous surface centered about the drainage hole 122 (as shown in FIG. 2). FIG. 2 illustrates an assembled base section 102 of the plant pot 100 in greater detail indicating that the base section 102 defines a continuous surface on the interior as well as the exterior to thereby reduce the risk of leaks from the pot 100 when the pot 100 is assembled.

Similarly, FIGS. 3 and 4 also illustrate the configuration of the throat 104 of the pot 100. In particular, the left-hand side of the first pot member 130a has an interior flange 190a defining an exterior recess 192a. The right-hand side of the first pot member 130a has an exterior flange 194a and an interior recess 196a. The exterior flange 194a can be positioned into the complementary exterior recess 192b of the second pot member 130b. In addition, the interior flange 190a of the first pot member 130a can be positioned into the complementary interior recess 196b of the second pot member 130b so as to define a substantially continuous inner and outer surface at the throat 104 of the plant pot 100.

The series of complementary flanges and recesses in the base section 102, body section 106, and throat 104 of the pot members 130a, 130b, as described in the preceding paragraphs, allows two pot members of identical and symmetrical configuration to be used to form the pot 100. Advantageously, using identical members for the pot 100 reduces manufacturing and production costs associated with the pot 100 because both pot members can be formed using the same mold or mold cavity. As a result, in one embodiment, it is not necessary to have two separate molds or mold cavities in order to construct the present plant pot 100.

Moreover, in this particular implementation, an upper securing member 134a is also formed on the outer surface of the left-hand sidewall of the first pot member 130a so as to inhibit outward movement of the exterior flange 194b of the second pot member when the pot is assembled as a result of dirt pressing against the throat 104 of the pot 100. Similarly, an upper securing member 134b contained on the sidewall of the second pot member 130b, adjacent the right-hand sidewall of the first pot member 130a, prevents outward movement of the exterior flange 194a of the first pot member 130a when the exterior flange 194a is engaged with the exterior recess 192b of the second pot member 130b.

It will be appreciated from the foregoing discussion that the pot of the present invention with the two identical pot members is easy to manufacture as it requires only a single mold. Moreover, by matching the edges with interior and exterior flanges and recesses, a substantially uniform interior surface of the pot can be achieved in the assembled position to thereby reduce the likelihood of leakage. As such, the pot of the illustrated embodiments provide a novel pot assembly which is more readily manufactured and used and provides for greater stability while still allowing for the user to periodically remove and replace the plant out of the pot. It will be further appreciated that this bi-partite style held together with straps allows for limitless design configurations for pots with wider bases and narrow openings at the throat while maintaining easy removal at the time of repotting.

FIG. 5 illustrates a front elevation view of the plant pot 100. As shown in FIG. 5, the base section 102 of the plant pot 100 is larger than the throat 104 of the plant pot 100. Typical plant pots have base sections which are smaller than the throat or upper rim of the pot. The wide-base configuration of the present invention has a lower center of gravity than typical plant pots since a greater concentration of soil, and a greater amount of the pot material itself, is disposed near the base section 102 of the pot 100 as opposed to the throat 104. As a result, such wide-base configuration is advantageous because such a base section 102 provides greater stability to the pot 100 so as to minimize undesirable tipping of the pot 100 caused by, for example, natural conditions such as wind.

In one embodiment, the pot 100 is a generally round pot having a base section 102 with a larger circular area than the circular area defined by the throat 104 of the pot 100. The body section 106 is also generally round and extends from the base section 102 and terminates at the throat 104. The body section 106 preferably forms a generally bulbous shape wherein the body section 106 first extends generally outward from the base section until it reaches its maximum diameter. Then, the body section 106 proceeds to extend generally inward toward the throat 104 where it ultimately reaches its minimum diameter at the throat 104 of the pot 100. The above-described shape and configuration of the pot 100 is only one embodiment of the present plant pot 100. In other embodiments, the pot 100 may have different configurations which have a larger base than throat such as, but not limited to, a pyramid structure or a conical structure.

The first pot member 130a and the second pot member 130b mate with each other to form the pot 100. The two members 130a, 130b meet at a center portion of the pot 100 and a seam 132 on the outer surface of the pot 100 is defined by their junction. The seam 132 runs vertically downward from the throat 104 to the base section 102 and the width of the seam 132 is minimized when the two pot members 130a, 130b are fully engaged such that pot 100 contains a substantially continuous outer surface. As described further in connection with FIG. 10, the width of the seam may increase slightly so as permit at least some expansion in a horizontal direction of the plant pot 100 to accommodate natural growth of a plant positioned within the plant pot 100.

The pot 100 can be a variety of sizes and can be manufactured to suit the needs of a particular user. In one embodiment, the pot 100 is a relatively small pot with a base section 102 having a diameter of 10 inches and a throat 104 having an opening of 6 inches in diameter. In another embodiment, the pot 100 is a medium-sized pot with a base section 102 having a diameter of 14 inches and a throat 104 having an opening of 10 inches. In yet another embodiment, a relatively large pot 100 is provided with a base section having a diameter of approximately 18 inches and a throat 104 having an opening of approximately 16 inches. The above-provided dimensions are merely illustrative and do not limit the present plant pot to any particular size or configuration.

As shown in FIG. 5, the pot 100 preferably has a lower retainer 140 and an upper retainer 142 that extend around the outer surface of the pot 100. The retainers 140, 142 provide a mechanism for maintaining the first pot member 130*a* and the second pot member 130*b* engaged and in an attached configuration so as to provide an area in which to place a plant therein. In one embodiment, the lower retainer 140 is positioned within a lower receiving recess 141 that is disposed substantially near the base section 102 of the pot. The lower receiving recess 141 provides a slight channel on the outer surface of the pot 100 in which the lower retainer 140 can be positioned. The lower receiving recess 141 facilitates in maintaining the lower retainer 140 in a stable position on the outer surface of the pot 100 so as to inhibit the lower retainer 140 from accidentally sliding off the pot 100. Similarly, an upper retainer 142 is positioned within an upper receiving recess 143. The upper receiving recess 143 acts is the same way as the lower receiving recess 141 and ensures that the upper retainer 142 maintains a stable position on an upper portion of the outer surface of the pot 100 near the throat 104.

The disclosed embodiments do not limit the number of retainers that may be used in connection with the pot 100. In some embodiments, the pot 100 may employ just one retainer located anywhere along the outer or inner surface of the pot 100. In other embodiments, the pot 100 may use three, four, or more retainers to maintain the pot members 130*a*, 130*b* in an attached configuration.

In one embodiment, the retainers 140, 142 comprise expandable restraining bands composed of a hook and loop fastener material. As such, the inner surface of a restraining band is preferably a hook material and the outer surface is preferably a loop material. One end of the restraining band can be placed over the opposite longitudinal end of the restraining band and attached thereto by a hook and loop fastener attachment. As a result, the restraining bands can securely retain the pot in an attached configuration. The bands can easily be removed from the pot by simply detaching the inner surface of one end from the outer surface of the other end of the restraining band. In one embodiment, the restraining bands comprise 0.5 inch wide high-strength hook and loop straps. In another embodiment, the restraining bands comprise rubber elastic loops such as rubber bands. In another embodiment, the retaining bands are comprised of an acrylonitrile-butadiene-styrene (ABS) copolymer thermoplastic material such that they are made of the same material as the first pot member and the second pot member. In yet another embodiment, the retaining bands are comprised of a metal alloy such as a high-strength steel alloy.

Hook and loop fastener restraining bands are particularly advantageous because they can be used to increase the aesthetic appeal of the plant pot 100. For example, decorative sheets containing complementary hook fasteners can be placed on the outer surface of the plant pot by fastening an upper portion of the sheet to an upper hook and loop restraining band and a lower portion of the decorative sheet to a lower hook and loop restraining band. The sheets may be changed throughout the year to correspond to the particular season and further enhance the aesthetic characteristics of the plant pot 100.

In another embodiment of the plant pot 100, securing members 134, 136 maintain the first pot member 130*a* and the second pot member 130*b* in an attached configuration. A lower securing member 136 and an upper securing member 134 are disposed near the base section 102 and the throat 104, respectively, of the pot 100. The upper and lower securing members 134, 136 prevent outward movement of the first pot member 130*a* and the second pot member 130*b* that may be caused by soil or plant roots pressing against the interior surface of the pot 100. The upper and lower securing members 134, 136 work in conjunction with the retainers 140, 142 so as to maintain the first pot member 130*a* and the second pot member 130*b* engaged with respect to each other.

Figure 6:
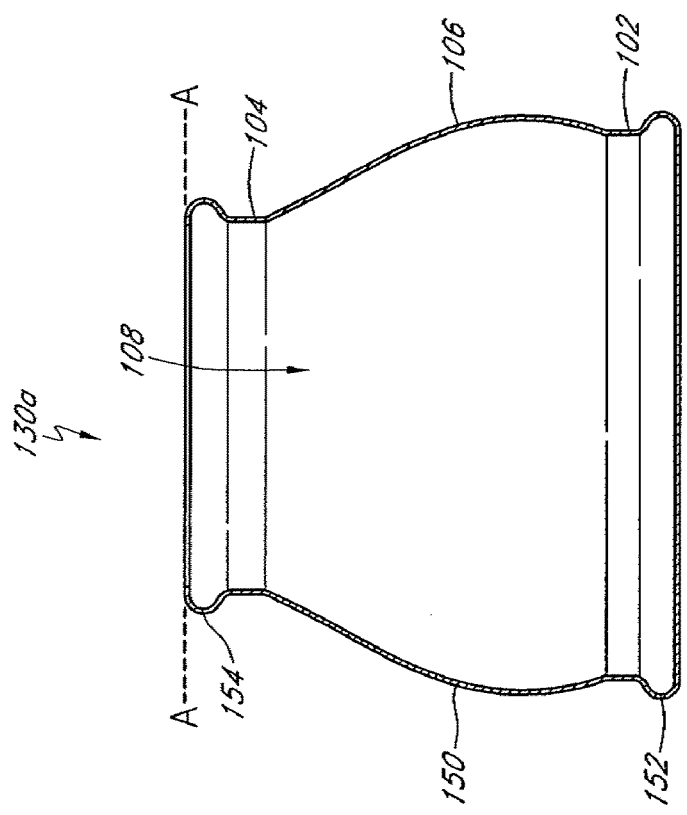
FIG. 6 is a section view of the plant pot taken along line A-A as shown in FIG. 1 illustrating the interior configuration of a first pot member.

As shown in FIG. 6, a front view of the first pot member 130*a* is illustrated. This view represents the same configuration as a section view of the pot 100 as taken along line A-A as shown in FIG. 1. It can be seen that the base section 102, body section 106, and throat 104 of the pot 100 comprise a substantially continuous inner and outer surface so as to define a large cavity 108 contained within the structure of the pot 100. The cavity 108 has a larger base section 102 than throat 104 so that a larger amount of soil and plant material can be disposed near the base section of the pot 100 thereby lowering the center of gravity of the pot 100.

The pot wall 150 of the pot member 130*a* is relatively thin. In one embodiment, the pot wall 150 is approximately 0.25 inches thick. Advantageously, such a shell thickness minimizes the weight of the plant pot 100 but still provides sufficient strength and durability so as to properly house the base of a plant contained therein. The pot member 130*a* also contains a lower rim 152 and an upper rim 154. The lower rim 152 is positioned on the base section 102 of the pot member 130*a* and extends outward therefrom so as to provide a wide bottom surface of the pot 100 that can be stably positioned on the ground or other surface. The upper rim 154 disposed on the throat 104 of the pot member 130*a* extends generally outward from the outer surface of the pot 100 so as to provide an outer rim that can be used to handle and hold the plant pot 100. Advantageously, the upper rim 154 enables a user to move and manipulate the plant pot 100 relatively easily since a user's fingers can be positioned on the underside of the upper rim 154 and a force can be exerted on the pot 100 in a horizontal or vertical direction thereby moving the pot 100.

Figure 7:
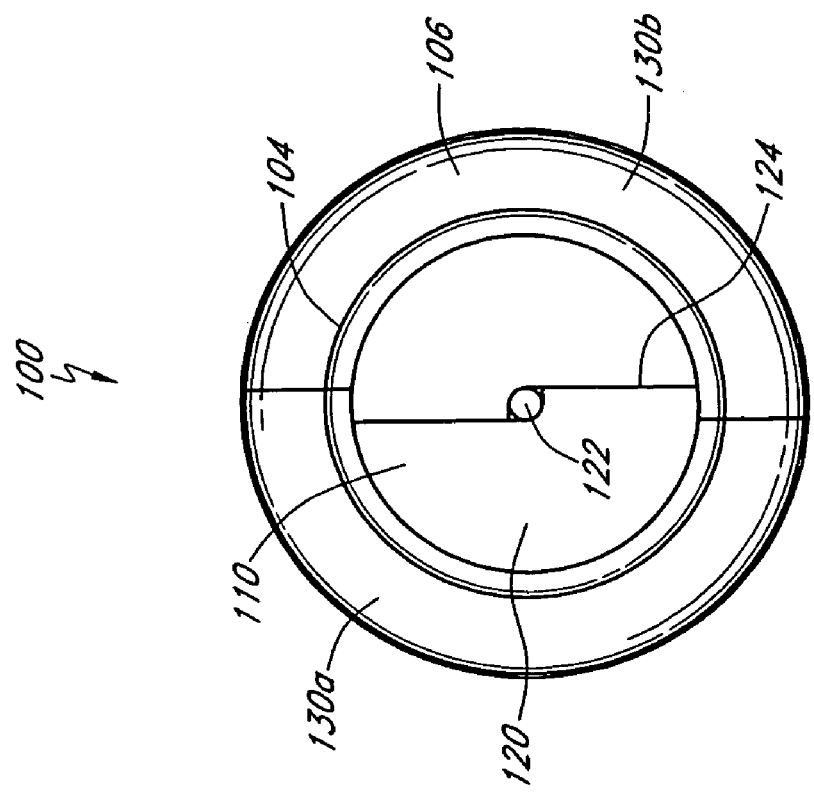
FIG. 7 is a top view of the plant pot as shown in FIG. 1.

FIG. 7 shows a top view of the plant pot 100. In this embodiment, the first pot member 130*a* and the second pot member 130*b* are engaged so as to define a substantially continuous inner and outer surface of the plant pot 100. It can be seen that the opening 110 in the throat 104 of the pot 100 is smaller than the body section 106 of the pot 100. The bottom surface 120 of the pot 100 includes a drainage hole 122 and a drainage channel 124. In one embodiment, the drainage hole 122 is positioned in the center of the plant pot 100 when viewed from above as shown in FIG. 7.

Figure 8:
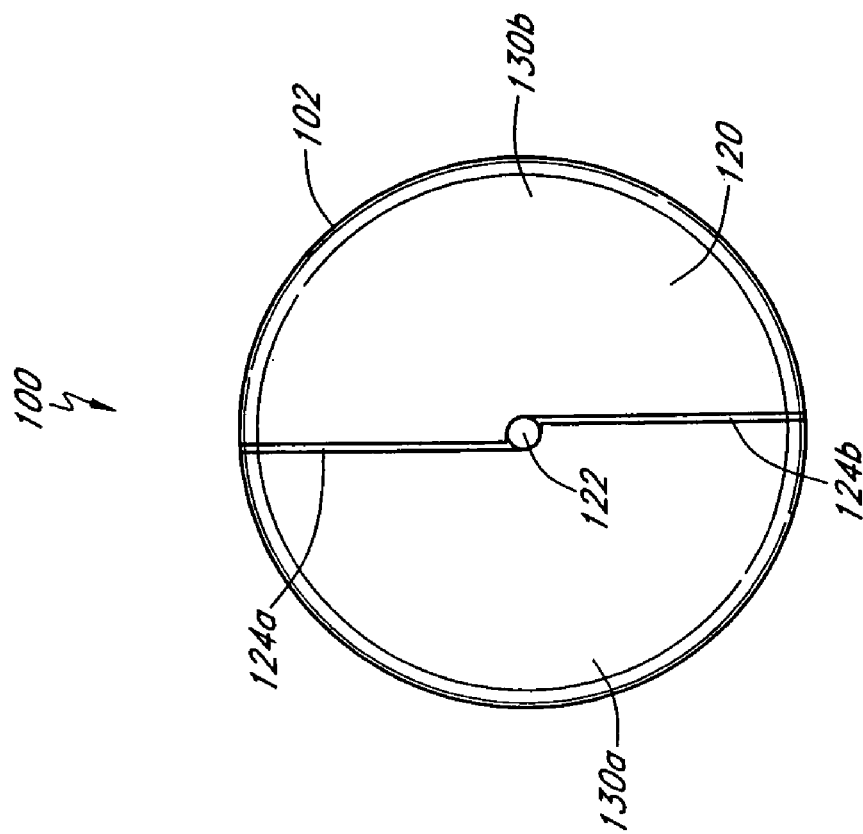
FIG. 8 is a bottom view of the plant pot as shown in FIG. 1.

FIG. 8 shows a bottom view of the plant pot 100 having a first pot member 130*a* and a second pot member 130*b* in an engaged position. The base section 102 of the pot 100 has a bottom surface 120. In one embodiment, the bottom surface 120 is a round surface defining a circle. In other embodiments of the pot 100, however, the bottom surface may be oval, rectangular, or define some other non-standard polygon. In one embodiment, the pot has a built-in drainage system comprising a drainage hole 122 and drainage channels 124a, 124b. A drainage hole 122 is positioned at a center point of the bottom surface 120 and has drainage channels 124a, 124b extending outward therefrom. A first drainage channel 124a extends from the drainage hole 122 to one side of the plant pot 100 while a second drainage channel 124b extends from the drainage hole to an opposite side of the plant pot 100. Advantageously, such configuration permits excess water and material to exit the pot 100 via the drainage hole 122 and be directed away from the pot 100 via the drainage channels 124a, 124b.

Figure 9C:
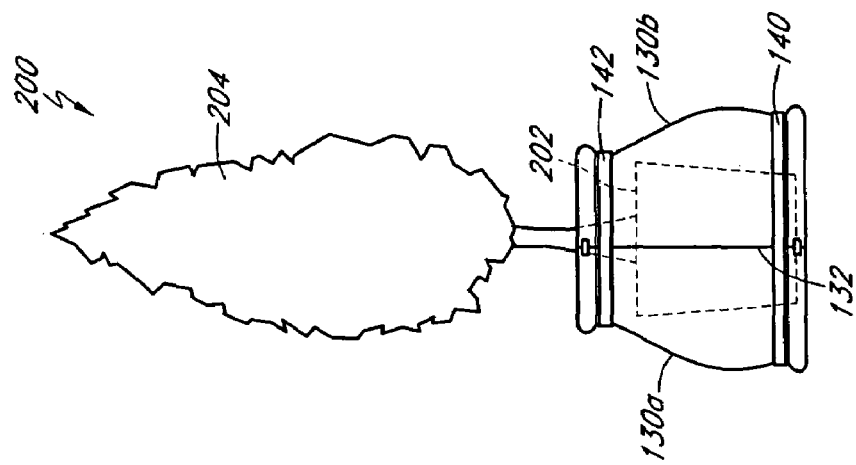
FIG. 9C is a front elevation view similar to FIG. 9B wherein a lower retainer and an upper retainer are attached to the plant pot so as to maintain the plant pot in an attached configuration.
Figure 9B:
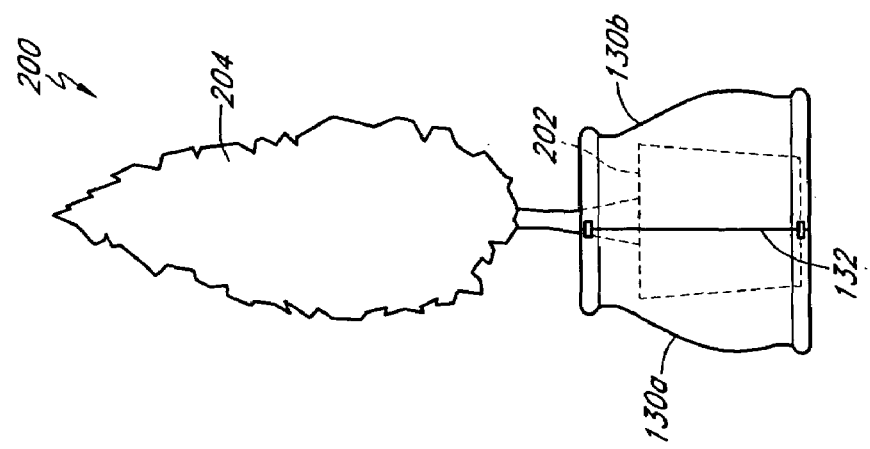
FIG. 9B is a front elevation view of a plant having a base portion showing the plant pot in an attached configuration containing the plant's base portion therein.
Figure 9A:
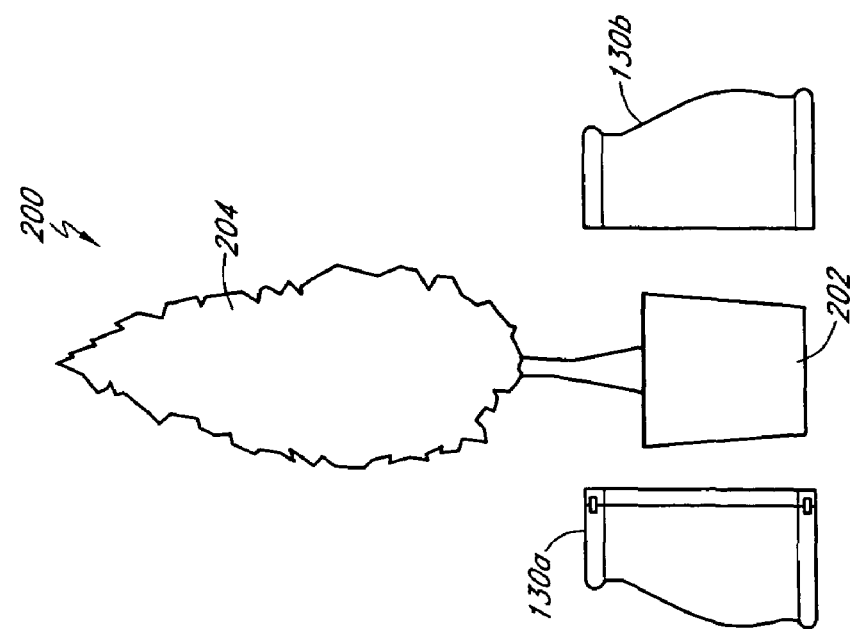
FIG. 9A is a front elevation view of a plant having a base portion showing the plant pot in a detached configuration surrounding the plant's base portion.

As shown in FIGS. 9A-9C, the pot members 130a, 130b can be positioned around a base portion 202 of a plant 200 and attached so as to form a plant pot 100 and provide a housing for the base 202 of the plant 200. As shown in FIG. 9A, a typical plant 200 is provided having a base portion 202 and a body portion 204. The first pot member 130a can be positioned on one side of the plant base 202 and the second pot member 130b can be positioned on the other side of the plant base 202. As shown in FIG. 9B, the pot members 130a, 130b can be brought together such that the edge of the pot members 130a, 130b engage so as to define a substantially continuous inner and outer surface. The plant base 202 fits within a cavity of the plant pot 100. As the pot members 130a, 130b mate with each other, the seam 132 minimizes in width so as to define a continuous outer surface of the plant. In FIG. 9C, the further step of applying at least one retainer to the pot 100 is shown. In this embodiment, a lower retainer 140 is positioned substantially near a base section of the pot 100 and an upper retainer 142 is positioned substantially near a throat of the pot 100. Advantageously, the retainers 140, 142 maintain the first pot member 130a and the second pot member 130b in an attached configuration.

Figure 10:
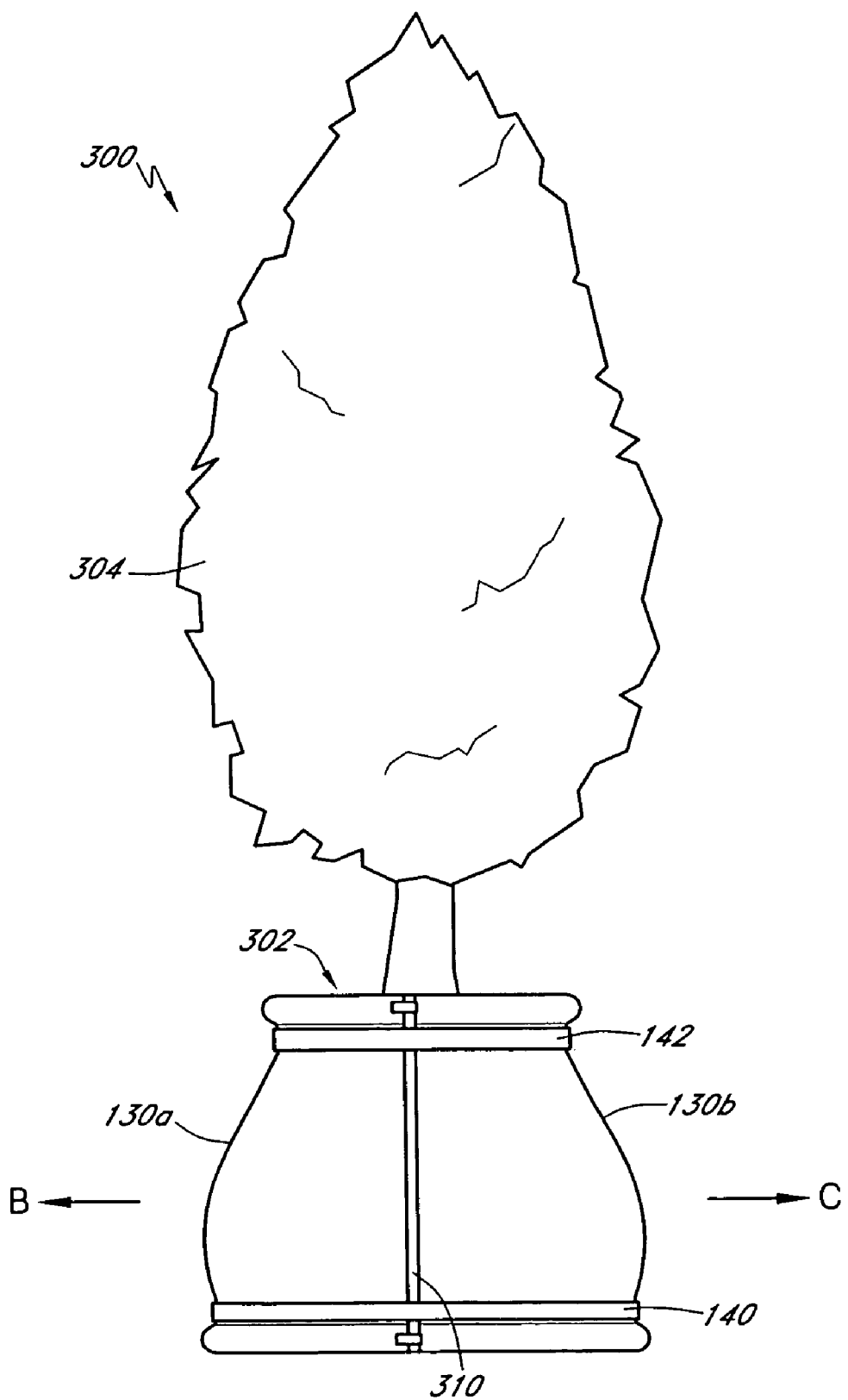
FIG. 10 is a front elevation view showing that the plant pot is capable of expanding in horizontal directions B and C so as to allow for natural growth of a plant within the plant pot as shown in FIG. 9C.

FIG. 10 shows a relatively large plant 300 contained within the plant pot 100. The roots of a plant naturally grow throughout the life of the plant. If a plant is contained in a plant pot, the plant's roots may grow too large for the plant pot and exert a force on the interior wall of the plant pot. As a result, the plant pot may become damaged by this natural root growth or the roots themselves might become damaged by the pot wall inhibiting their natural growth and expansion. The present plant pot 100 addresses this problem of rootball growth and provides a solution to such problem.

As shown in FIG. 10, a plant pot 100 having a first pot member 130a and a second pot member 130b contains a relatively large plant 300 having a body portion 304 extending outward from the plant pot 100 and a base portion 302, with roots, soil, and the like, contained within the plant pot 100. The retaining devices 140, 142 disposed on the outer surface of the pot members 130a, 130b are not entirely rigid and permit some expansion of the plant pot 100. As a result, the first pot member 130a is capable of expanding in the horizontal direction B and the second pot member 130b is capable of expanding in the horizontal direction C. When such expansion occurs, a gap 310 is created between the first pot member 130a and the second pot member 130b. In one embodiment, the gap 310 has a width between 0.25 inches and 0.5 inches. Advantageously, such expansion of the plant pot 100 permits the growing rootball of the base portion 302 of the plant 300 to maintain natural growth within the plant pot 100. If a user notices the plant pot 100 has expanded a noticeable amount, the user will be on alert that the plant is becoming too large for such existing plant pot and should be replanted into a larger pot.

The plant pot described above in connection with FIGS. 1-10 having two identical pot members is easy to manufacture as, in one embodiment, it requires only a single mold. Furthermore, by matching the edges with interior and exterior flanges and recesses, a substantially uniform interior surface of the pot can be achieved in the assembled position to thereby reduce the likelihood of leakage. As such, the pot of the illustrated embodiment provides a novel pot assembly which is more readily manufactured and used and provides for greater stability while still allowing for the user to periodically remove and replace the plant out of the pot. It will be further appreciated that this bi-partite style held together with straps allows for limitless design configurations for pots with wider bases and narrow openings at the throat while maintaining easy removal at the time of repotting.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A plant pot capable of being separated so as to facilitate removal of a plant from the pot, the pot comprising:

a first pot member that has a base section that defines a surface of the plant pot that is positionable on the ground wherein the base section has a first area and a first and a second edge having a first and a second configuration respectively, wherein the first pot member also includes a first and second body section respectively coupled to the base section so as to extend outward therefrom wherein the first and second body sections which terminate at a throat that defines a second area less than the first area of the base section and wherein the first and second body sections respectively define edges having a third and fourth configuration respectively, wherein the first configuration defines an exterior recess and an interior flange such that the interior flange is substantially continuous with an inner surface of the base section, wherein the second configuration defines an exterior flange and an interior recess such that the exterior flange is substantially continuous with an outer surface of the base section, wherein the third configuration defines an exterior sidewall recess and an interior sidewall flange such that the interior sidewall flange is substantially continuous with an inner surface of the first and second body sections, wherein the fourth configuration defines an exterior sidewall flange and an interior sidewall recess such that the exterior sidewall flange is substantially continuous with an outer surface of the first and second body sections;

a second pot member that has a base section that defines a surface of the plant pot that is positionable on the ground wherein the base section has a first area and a first and a second edge having a first and a second configuration respectively, wherein the second pot member also includes a first and second body section respectively coupled to the base section so as to extend outward therefrom wherein the first and second body sections which terminate at a throat that defines a second area less than the first area of the base section and wherein the first and second body sections respectively define edges having a third and fourth configuration respectively, wherein the first configuration defines an exterior recess and an interior flange such that the interior flange is substantially continuous with an inner surface of the base section, wherein the second configuration defines an exterior flange and an interior recess such that the exterior flange is substantially continuous with an outer surface of the base section, wherein the third configuration defines an exterior sidewall recess and an interior sidewall flange such that the interior sidewall flange is substantially continuous with an inner surface of the first and second body sections, wherein the fourth configuration defines an exterior sidewall flange and an interior sidewall recess such that the exterior sidewall flange is substantially continuous with an outer surface of the first and second body sections;

wherein the first and second configurations of the edges of the first and second base section are complementary to each other and wherein the third and fourth configurations of the edges of the first and second body sections are complementary to each other such that the first and second pot members can be positioned together, the base section of the first pot member engages the base section of the second pot member such that the first configuration of the first pot member mates with the second configuration of the second pot member and the second configuration of the first pot member mates with the first configuration of the second pot member, the body sections of the first pot member engage the body sections of the second pot member such that the third configuration of the first pot member mates with the fourth configuration of the second pot member and the fourth configuration of the first pot member mates with the third configuration of the second pot member, wherein with the first and second base sections of the first and second pot members and the first and second body sections of the first and second pot members engage with each other so as to define a substantially continuous inner wall and a substantially contained inner space that is adapted to receive a plant therein; and at least one retainer that extends about an outer surface of the first and second pot members to retain the first and second pot members in the engaged position wherein the at least one retainer is adapted to be disengaged from the first and second pot member so as to allow the first and second pot members to be separated from each other to permit removal of the plant positioned therein.

2. The plant pot of claim 1, wherein the first pot member and the second pot member have corresponding shapes and are substantially symmetrical in configuration such that the first area of the base section of the first pot member is substantially equal to the first area of the base section of the second pot member and the first and second body sections of the first pot member are substantially similar to the first and second body sections of the second pot member.

3. The plant pot of claim 1, wherein the first pot member and the second pot member are manufactured using the same mold.

4. The plant pot of claim 1, wherein the interior flange of the base section of the first pot member, the interior flange of the base section of the second pot member, the inner surface of the base section of the first pot member, and the inner surface of the base section of the second pot member collectively define a substantially continuous inner surface on the base section of the plant pot.

5. The plant pot of claim 1, wherein the interior sidewall flange of the first pot member, the interior sidewall flange of the second pot member, the inner surface of the first and second body sections of the first pot member, and the inner surface of the first and second body sections of the second pot member collectively define a substantially continuous inner surface on the body section of the plant pot.

6. The plant pot of claim 1, wherein the at least one retainer permits at least some expansion in a generally horizontal direction of the plant pot so as to allow for natural growth of the plant positioned within the plant pot.

7. The plant pot of claim 6, wherein the at least one retainer comprises a first retainer and a second retainer and wherein the first retainer comprises a lower retainer disposed substantially near the base section of the plant pot and the second retainer comprises an upper retainer disposed substantially near the throat of the plant pot.

8. The plant pot of claim 6, wherein the at least one retainer is comprised of a material selected from the group consisting of: hook and loop fastener material, rubber elastic material, aerylonitrile.-butadiene-styrene (ABS) copolymer thermoplastic material, and steel alloy material.

9. The plant pot of claim 1, wherein an outer surface of the first pot member and an outer surface of the sccond pot member are configured so as to define at least one receiving recess for receiving the at least one retainer and maintaining the position of the at least one retainer on the outer surface of the plant pot so as to inhibit accidental removal of the at least one retainer from the outer surface of the plant pot.

10. The plant pot of claim 1 further comprising a first indentation disposed on the base section of the first pot member and a second indentation disposed on the base section of the second pot member, wherein the first indentation and the second indentation define a drain hole when the first pot member and the second pot member are engaged so as to direct excess drainage water out of the plant pot, and further comprising at least one drain channel disposed along a bottom surface of the base section of the plant pot so as to further facilitate directing excess drainage water out of the plant pot and away from the plant pot by directing pressurized drain water concentrated near the drain hole along the at least one drain channel and to the outer perimeter of the bottom surface of the base section of the plant pot.

11. The plant pot of claim 1 further comprising at least one securing member disposed on the outer surface of the first pot member and the second pot member for further retaining the first and second pot members in the engaged position.

12. The plant pot of claim 1, wherein the exterior flange of the base section of the first pot member, the exterior flange of the base section of the second pot member, the outer surface of the base section of the first pot member, and the outer surface of the base section of the second pot member collectively define a substantially continuous outer surface on the base section of the plant pot.

13. The plant pot of claim 1, wherein the exterior sidewall flange of the first pot member, the exterior sidewall flange of the second pot member, the outer surface of the first and second body sections of the first pot member, and the outer surface of the first and second body sections of the second pot member collectively define a substantially continuous outer surface on the body section of the plant pot.

14. A plant pot capable of being separated so as to facilitate removal of a plant from the pot, the pot comprising:

a first pot member comprising a base section and a throat, wherein the base section is larger than the throat;

a second pot member comprising a base section and a throat, wherein the base section is larger than the throat and wherein the second pot member mates with the first pot member so as to define a plant pot having a substantially enclosed space sized so as to receive a plant therein and having at least a partial opening near the throat of the first pot member and the second pot member, wherein the first pot member and the second pot member have corresponding shapes each having substantially identical recesses and flanges, the pot members are substantially symmetrical in configuration such that they can be manufactured from the same mold; and at least one retainer for maintaining the first pot member and the second pot member in an attached configuration, wherein the first pot member and the second pot member each have a first and a second edge having a first and a second configuration respectively, the first configuration defining an exterior recess and an interior flange such that the interior flange is substantially continuous with an inner surface of the base section, the second configuration defining an exterior flange and an interior recess such that the exterior flange is substantially continuous with an outer surface of the base section, wherein the base section of the first pot member engages the base section of the second pot member such that the first configuration of the first pot member mates with the second configuration of the second pot member and the second configuration of the first pot member mates with the first configuration of the second pot member such that the base sections of the pot members engage with each other so as to define a substantially continuous inner wall and a substantially contained inner space that is adapted to receive a plant therein.

15. The plant pot of claim 14, wherein the at least one retainer permits at least some expansion in a generally horizontal direction of the plant pot so as to allow for natural growth of the plant positioned within the plant pot.

16. The plant pot of claim 14 further comprising a first indentation disposed on the base section of the first pot member and a second indentation disposed on the base section of the second pot member, wherein the first indentation and the second indentation define a drain hole when the first pot member and the second pot member are engaged so as to direct excess drainage water out of the plant pot, and further comprising at least one drain channel disposed along a bottom surface of the base section of the plant pot so as to further facilitate directing excess drainage water out of the plant pot and away from the plant pot by directing pressurized drain water concentrated near the drain hole along the at least one drain channel and to the outer perimeter of the bottom surface of the base section of the plant pot.

* * * * *